(12) United States Patent
Hirose

(10) Patent No.: US 8,544,440 B2
(45) Date of Patent: Oct. 1, 2013

(54) MARINE VESSEL PROPULSION DEVICE

(75) Inventor: Eiichi Hirose, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 1112 days.

(21) Appl. No.: 12/503,090

(22) Filed: Jul. 15, 2009

(65) Prior Publication Data

US 2010/0018498 A1    Jan. 28, 2010

(30) Foreign Application Priority Data

Jul. 25, 2008    (JP) .................................. 2008-191633

(51) Int. Cl.
*F02M 35/10* (2006.01)
*F02M 29/00* (2006.01)
*F02B 43/00* (2006.01)

(52) U.S. Cl.
USPC ....................... 123/184.61; 123/527; 123/590

(58) Field of Classification Search
USPC ......... 123/184.21–184.61, 527, 590; 48/144, 48/189.3
See application file for complete search history.

(56) References Cited

U.S. PATENT DOCUMENTS

| 6,860,771 | B2 * | 3/2005 | Mashiko | 440/88 A |
| 2001/0003691 | A1 * | 6/2001 | Watanabe | 440/88 |
| 2005/0016504 | A1 * | 1/2005 | Saito et al. | 123/516 |

* cited by examiner

*Primary Examiner* — Stephen K Cronin
*Assistant Examiner* — Sizo Vilakazi
(74) *Attorney, Agent, or Firm* — Keating & Bennett, LLP

(57) ABSTRACT

A marine vessel propulsion device includes an engine, an intake pathway which has a gas flow hole in the inner surface thereof and is arranged to supply air to the engine, and an air restrictor disposed on the upstream side with respect to the gas flow hole of the intake pathway. The air restrictor has a vent hole, and is arranged to restrict the amount of air to flow into the engine via the intake pathway. The vent hole of the air restrictor is arranged at a position which is near the inner surface of the intake pathway and corresponds to the gas flow hole.

11 Claims, 11 Drawing Sheets

COMPARATIVE EXAMPLE

COMPARATIVE EXAMPLE

MARINE VESSEL PROPULSION DEVICE

BACKGROUND OF THE INVENTION

1. Field of the Invention

The present invention relates to a marine vessel propulsion device including an engine and an intake pathway arranged to supply air to the engine.

2. Description of Related Art

An outboard motor is an example of a marine vessel propulsion device. An outboard motor relating to a prior art is disclosed in U.S. Patent Application Publication No. 2001/0003691A1. This outboard motor includes noise insulation equipment provided at a connecting portion between a throttle body and a silencer. This noise insulation equipment is a baffle plate provided to close the intake pathway. In the baffle plate, a plurality of openings for air intake are formed. The baffle plate has a hyperbolically curved sectional shape. It is described in this prior art publication that noise produced from the engine can be efficiently reflected.

SUMMARY OF THE INVENTION

The inventor of the invention described and claimed in the present application conducted an extensive study and research regarding the design and development of a marine propulsion device, and in doing so, discovered and first recognized new unique challenges and problems created by the interplay and trade-off relationships of the combination of various problems with marine propulsion devices. In view of the inventor's discovery of these new unique challenges and problems, the inventor further discovered and developed the preferred embodiments of the present invention, described in greater detail below, to provide unique solutions to previously unrecognized and unsolved problems.

In the intake pathway of the marine vessel propulsion device, a gas flow hole may be provided. Examples of the gas flow hole include a vapor introducing hole for introducing vapor (vapor of fuel) from a vapor separator tank, and a return gas introducing hole for returning an unburned gas produced in the engine to the inside of the intake pathway, etc. In the configuration of the prior art, when a gas flow hole is provided on the downstream side of the baffle plate, the air flow is blocked by the baffle plate, and accordingly, a vortex is generated on the downstream side of the baffle plate. If this vortex is generated near the gas flow hole, oscillations of an air column may occur inside the gas flow hole. Accordingly, so-called whistle noises or hoot noises pass through the intake pathway and leak to the outside from the inside of the gas flow hole, and cause noises to heard.

On the other hand, in the marine vessel propulsion device, an air restrictor may be disposed in the intake pathway. The air restrictor is provided in the intake pathway for adjusting the engine output by restricting the amount of air to flow into the engine. Therefore, in the marine vessel propulsion device having an air restrictor provided in the intake passage, if a gas flow hole is disposed on the downstream side of the air restrictor, the same noise (whistle noise or hoot noise) as in the prior art described above may occur.

In order to overcome the above-described problems, preferred embodiments of the present invention provide a marine vessel propulsion device which includes an engine, an intake pathway which has a gas flow hole on the inner surface thereof and is arranged to supply air to the engine, and an air restrictor which is disposed on the upstream side with respect to the gas flow hole of the intake pathway and is arranged to restrict a flow amount of air to flow into the engine via the intake pathway. The air restrictor has a first vent hole arranged at a position which is near the inner surface of the intake pathway and corresponds to the position of the gas flow hole.

With this configuration, although the air restrictor is arranged on the upstream side with respect to the gas flow hole of the intake passage, the first vent hole provided at the position corresponding to the gas flow hole smoothes out the air flow near the gas flow hole. Accordingly, a flow without a vortex can be formed near the gas flow hole, so that oscillations of an air column inside the gas flow hole are prevented. Therefore, whistle noises or hoot noises caused by oscillations of air columns are prevented.

Preferably, the first vent hole may have a first inner surface portion positioned on the outer side with respect to the center of the air restrictor, and the first inner surface may preferably align with the inner surface of the intake pathway as viewed in the air flowing-in direction of the intake pathway. With this configuration, air passing through the first vent hole arranged at the position corresponding to the gas flow hole flows along the inner surface of the intake pathway. Accordingly, the air flow near the gas flow hole can be restrained from becoming turbulent, and as a result, an occurrence of oscillations of air columns inside the gas flow hole are reliably prevented.

In this case, preferably, the first vent hole may have a second inner surface portion positioned on the center side of the air restrictor, and the second inner surface portion may preferably have a substantially arc shape as viewed in the air flowing-in direction of the intake pathway. With this configuration, no corner is formed at the portion of the first vent hole on the center side of the air restrictor, so that the air restrictor can be prevented from being broken. In other words, when the air restrictor blocks a portion of the intake pathway and causes a pressure difference between the upstream side and the downstream side of the air restrictor, stresses are easily concentrated on the corner of the vent hole. Therefore, by eliminating the corner at the portion of the vent hole on the center side of the air restrictor, the air restrictor can be prevented from being broken by the stress concentration.

In a preferred embodiment, preferably, the air restrictor may further include, in addition to the first vent hole, a second vent hole arranged at a position which is near the inner surface of the intake pathway and does not correspond to the position of the gas flow hole. In this case, preferably, the first vent hole and the second vent hole may be arranged at even intervals along the inner surface of the intake pathway as viewed in the air flowing-in direction of the intake pathway. With this configuration, air flows in through the plurality of vent holes arranged at even intervals along the inner surface of the intake pathway, so that the air flow near the inner surface of the intake pathway through the air restrictor can be made uniform.

Further, in a preferred embodiment, preferably, the air restrictor may further include a third vent hole arranged at a position corresponding to the central portion of the intake pathway as viewed in the air flowing-in direction of the intake pathway. With this configuration, as compared to the case in which the vent hole is formed only near the inner surface of the intake pathway, air can also be made to flow to the vicinity of the central portion of the intake pathway. Accordingly, generation of a negative pressure near the central portion of the intake pathway is reliably prevented, so that the air flow inside the intake pathway can be made even more uniform.

In a preferred embodiment, preferably, the intake pathway may include: a throttle body having a throttle valve arranged to adjust the flow amount of air to be supplied to the engine; and an intake portion which has an intake port and is connected to the upstream side of the throttle body. In this case, the air restrictor may be integral and unitary with the intake portion. With this configuration, as compared to the case in which the air restrictor is formed separately from the intake portion, the number of components can be reduced.

In this case, preferably, the gas flow hole may be arranged near the throttle valve of the throttle body, the air restrictor may be arranged near the boundary of the intake portion with the throttle body, and the first vent hole of the air restrictor may be arranged at a position corresponding to the gas flow hole arranged near the throttle valve. With this configuration, even when the gas flow hole is arranged near the throttle valve at which the air flow rate greatly changes and the air flow easily generates a vortex, the gas flow hole can be prevented from being influenced by the vortex. Therefore, occurrences of whistle noises or hoot noises are more reliably prevented.

In a preferred embodiment, preferably, the intake pathway may include: a throttle body having a throttle valve arranged to adjust the flow amount of air to be supplied to the engine; and an intake portion which has an intake port and is connected to the upstream side of the throttle body. In this case, a sealing member which is arranged between the intake portion and the throttle body may be further provided to seal the area between the intake portion and the throttle body. This sealing member may constitute the air restrictor having the first vent hole. With this configuration, the air restrictor can be provided on the sealing member, such as a gasket arranged between the intake portion and the throttle body, so that different from the case in which the air restrictor is defined by an exclusive member, the number of components can be prevented from increasing.

In a preferred embodiment, preferably, the first vent hole of the air restrictor and the gas flow hole may be disposed in the same direction with respect to the center of the air restrictor as viewed in the air flowing-in direction of the intake pathway. With this configuration, the air flow flowing at the portion provided with the gas flow hole can be prevented from becoming turbulent, so that whistle noises or hoot noises can be more reliably prevented.

In a preferred embodiment, preferably, a vapor separator tank arranged to separate a liquid fuel to be supplied to the engine and vapor of the fuel may be further provided. In this case, the gas flow hole may include a vapor introducing hole arranged to introduce the separated vapor of the fuel from the vapor separator tank into the intake pathway. With this configuration, when it is desired to provide a hole for introducing vapor from the vapor separator tank inside the intake passage, whistle noises or hoot noises can be prevented from being produced depending on the relationship between the position of the vapor introducing hole and the shape of the air restrictor.

Other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
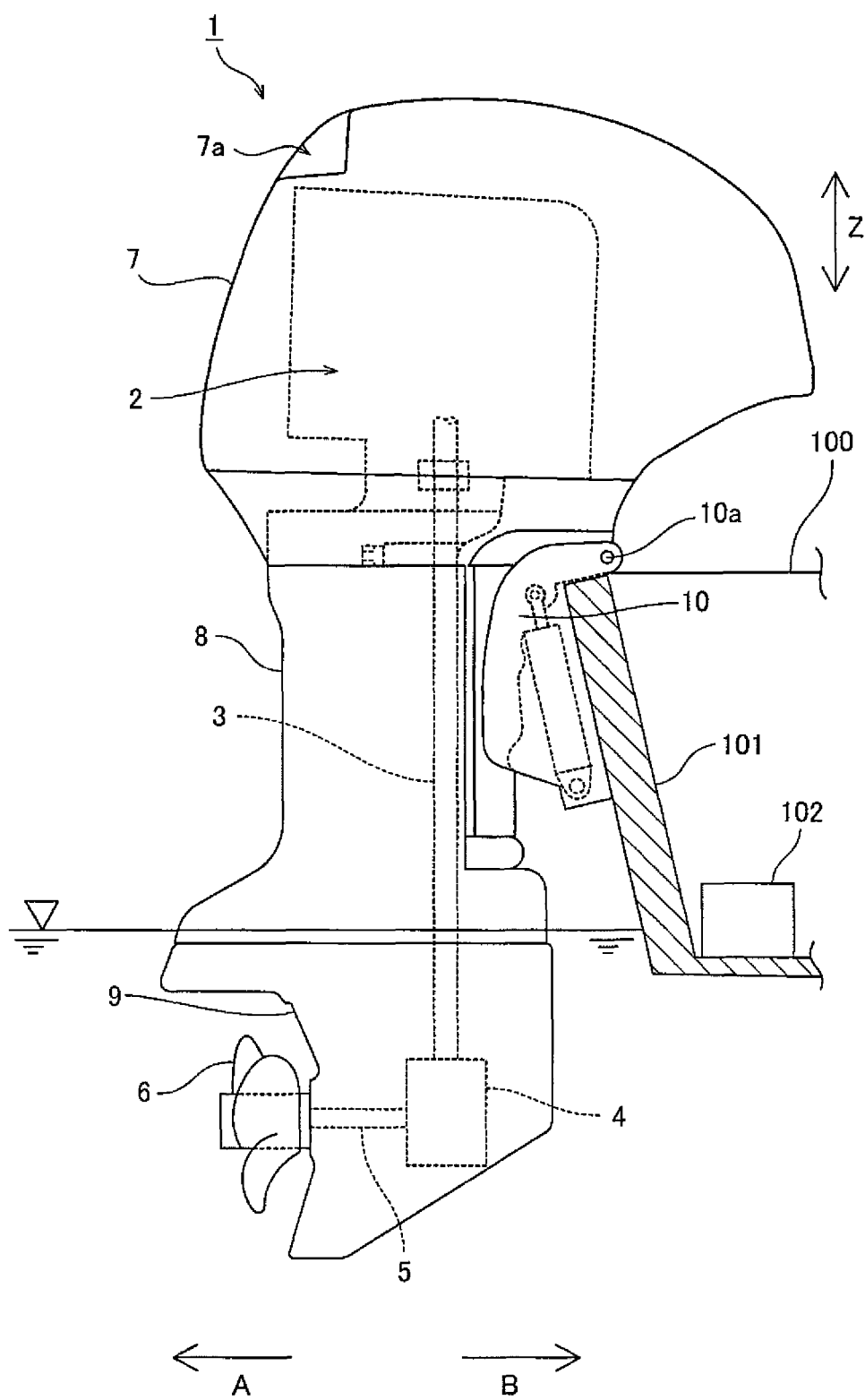
FIG. 1 is a side view showing an entire configuration of an outboard motor according to a first preferred embodiment of the present invention.

FIG. 1 is a side view showing an entire configuration of an outboard motor of a first preferred embodiment of the present invention. In this first preferred embodiment, an example in which a marine vessel propulsion device of the present invention is applied to an outboard motor will be described. The outboard motor 1 of this preferred embodiment is attached to a transom 101 of a hull 100 via a clamp bracket 10 so as to be steered and tilted. Therefore, the outboard motor 1 can assume various postures with respect to the hull 100 in an actual use state; however, in this specification, for the sake of convenience, based on a state where the outboard motor 1 assumes a predetermined reference posture, the directions of the up-down, left-right, and front-rear are defined. The reference posture is a posture of the outboard motor 1 with a steering angle of zero and a tilt angle of zero with respect to the hull 100 with a horizontal posture. In this state, when a propulsive force in the forward drive direction is generated from the outboard motor 1, the hull 100 moves straight ahead. In other words, in this specification, as expressions showing the directions of the outboard motor 1 and the members, the heading direction of the hull 100 with the outboard motor 1 when it moves ahead, in other words, when it moves ahead straight will be referred to as "front," and the direction 180-degree opposite to the front will be referred to as "rear." The left side of the heading direction when the hull 100 moves ahead will be referred to as "left," and the right side of the heading direction when the hull 100 moves ahead will be referred to as "right."

The outboard motor 1 includes an engine portion 2, a drive shaft 3, a forward-reverse switching mechanism 4, a propeller shaft 5, and a propeller 6. The drive shaft 3 is disposed in a posture extending in the vertical direction (Z direction), and is rotated by a driving force of the engine portion 2. The forward-reverse switching mechanism 4 is coupled to the lower end of the drive shaft 3. The propeller shaft 5 extends in the horizontal direction, and is coupled to the forward-reverse switching mechanism 4. The propeller 6 is attached to the rear end of the propeller shaft 5.

The engine portion 2 is housed inside an engine cover 7. Inside an upper case 8 and a lower case 9 arranged below the engine cover 7, the drive shaft 3, the forward-reverse switching mechanism 4, and the propeller shaft 5 are housed.

The outboard motor 1 is attached to the transom 101 provided on the reverse drive direction (arrow A direction) side of the hull 100 via a clamp bracket 10. The clamp bracket 10 supports the outboard motor 1 such that the outboard motor 1 can swing up and down around the tilt shaft 10a with respect to the hull 100. In the hull 100, a fuel tank 102 for storing fuel (gasoline) is provided. The fuel tank 102 and the engine portion 2 of the outboard motor 1 are connected by a fuel pipe not shown. The engine portion 2 of the outboard motor 1 is driven by using a fuel supplied from the fuel tank 102.

The drive shaft 3 is rotated by a driving force of the engine portion 2. The rotation of the drive shaft 3 is transmitted to the propeller shaft 5 via the forward-reverse switching mechanism 4. Accordingly, the propeller 6 is rotated. The forward-reverse switching mechanism 4 can switch the rotation direction of the propeller shaft 5. Accordingly, the rotation direction of the propeller 6 is switched. As a result, the hull 100 is propelled in the forward drive direction (arrow B direction) or in the reverse drive direction (arrow A direction) On the side portion on the reverse drive direction (arrow A direction) side of the engine cover 7, a vent hole 7a is provided. Air taken into the inside of the engine cover 7 via the vent hole 7a is supplied to the engine portion 2.

Figure 2:
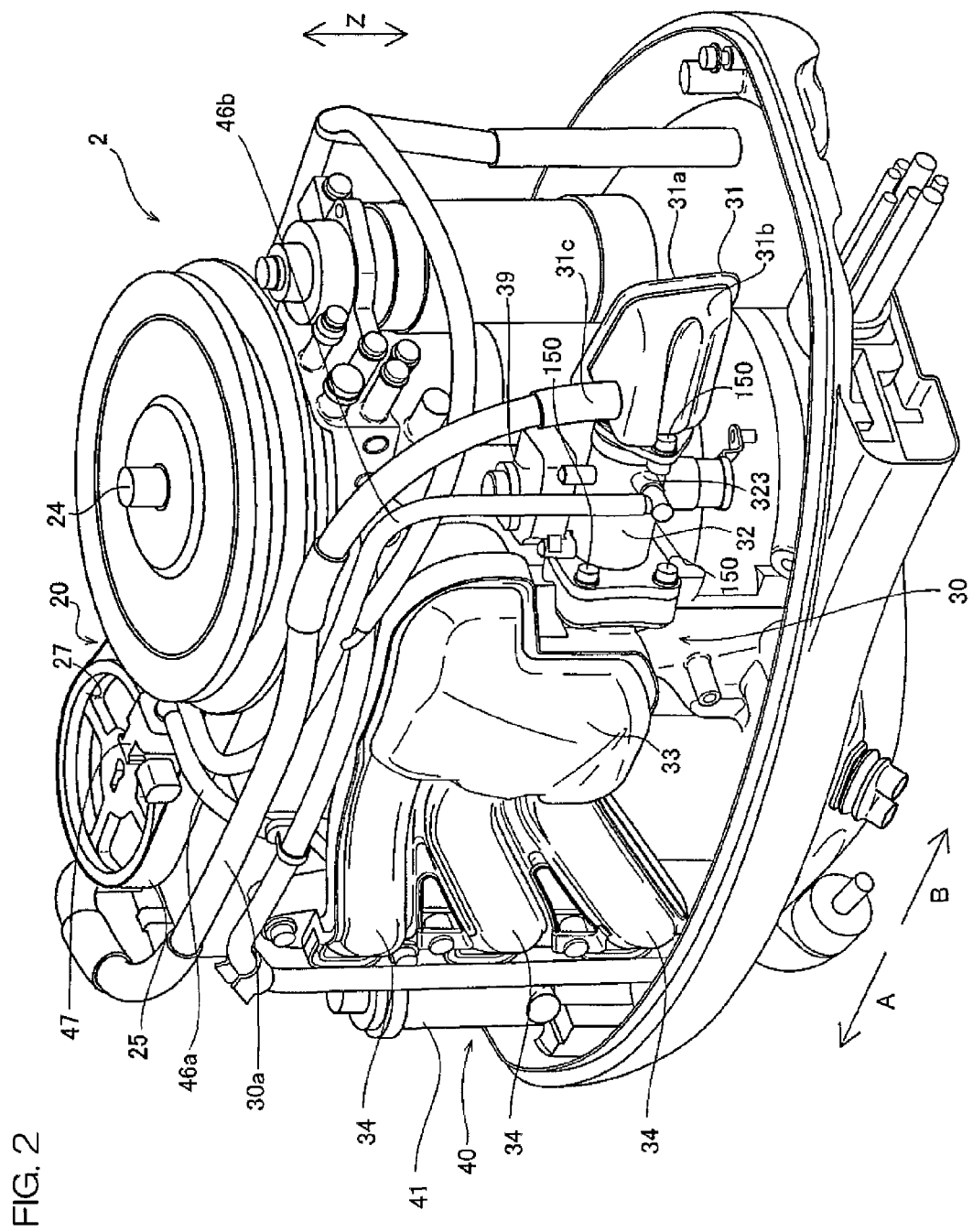
FIG. 2 is a perspective view showing an engine portion of the outboard motor of the first preferred embodiment of the present invention.
Figure 3:
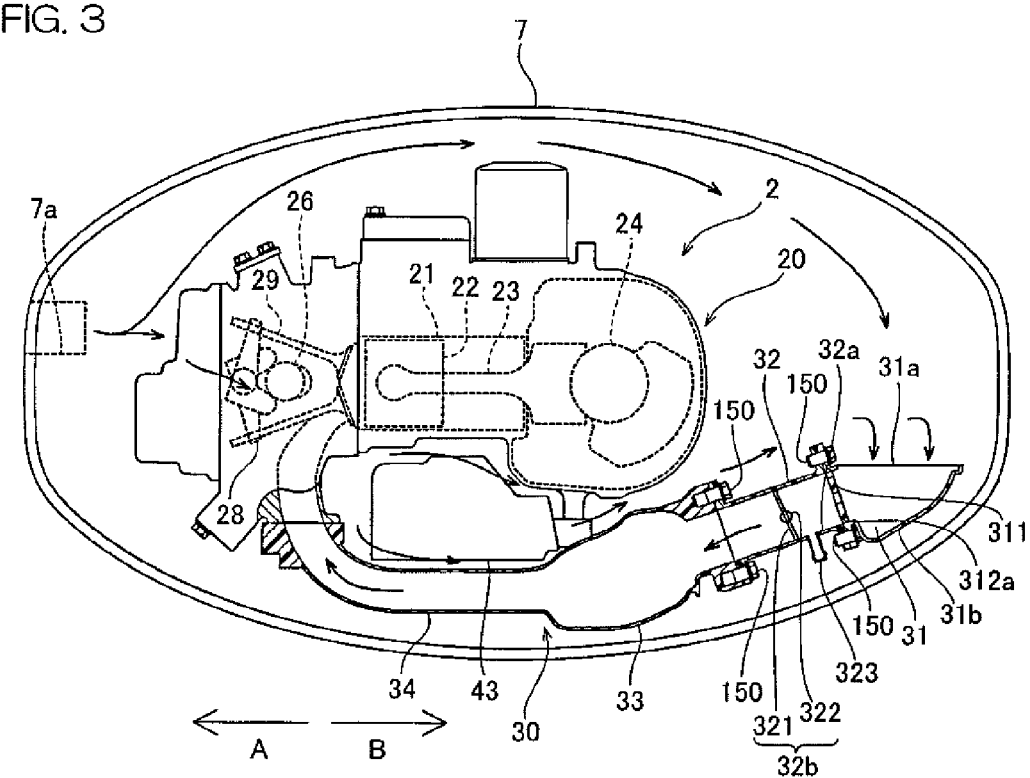
FIG. 3 is a plan view showing the engine portion of the outboard motor of the first preferred embodiment of the present invention.
Figure 4:
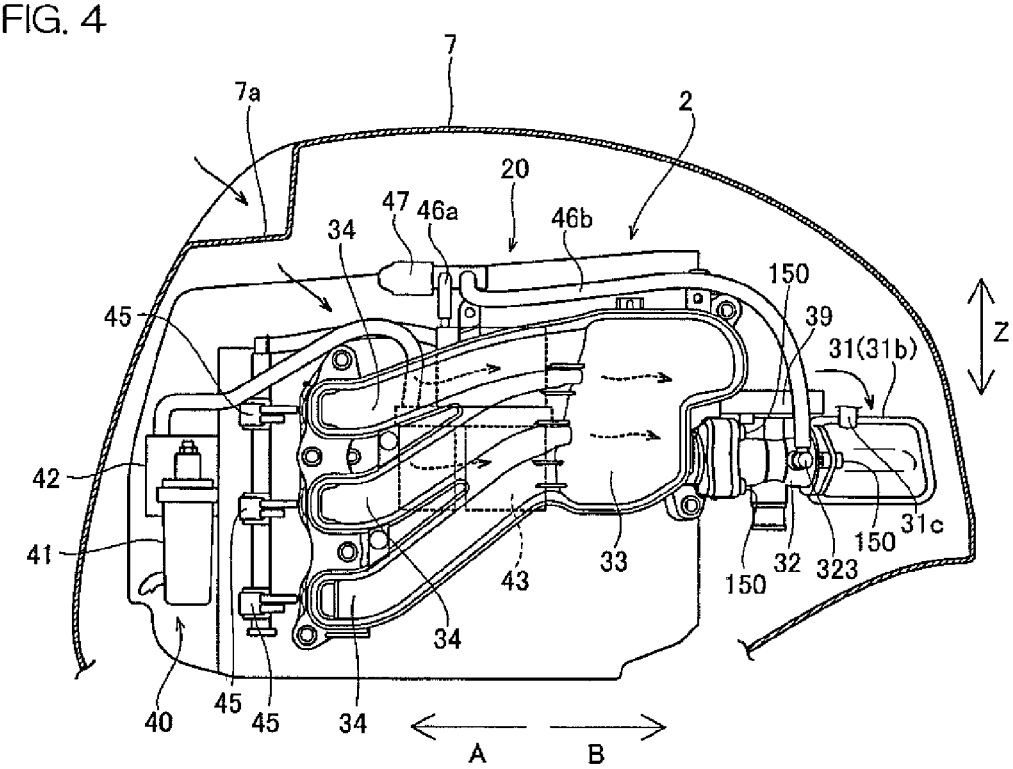
FIG. 4 is a side view showing the engine portion of the outboard motor of the first preferred embodiment of the present invention.
Figure 5:
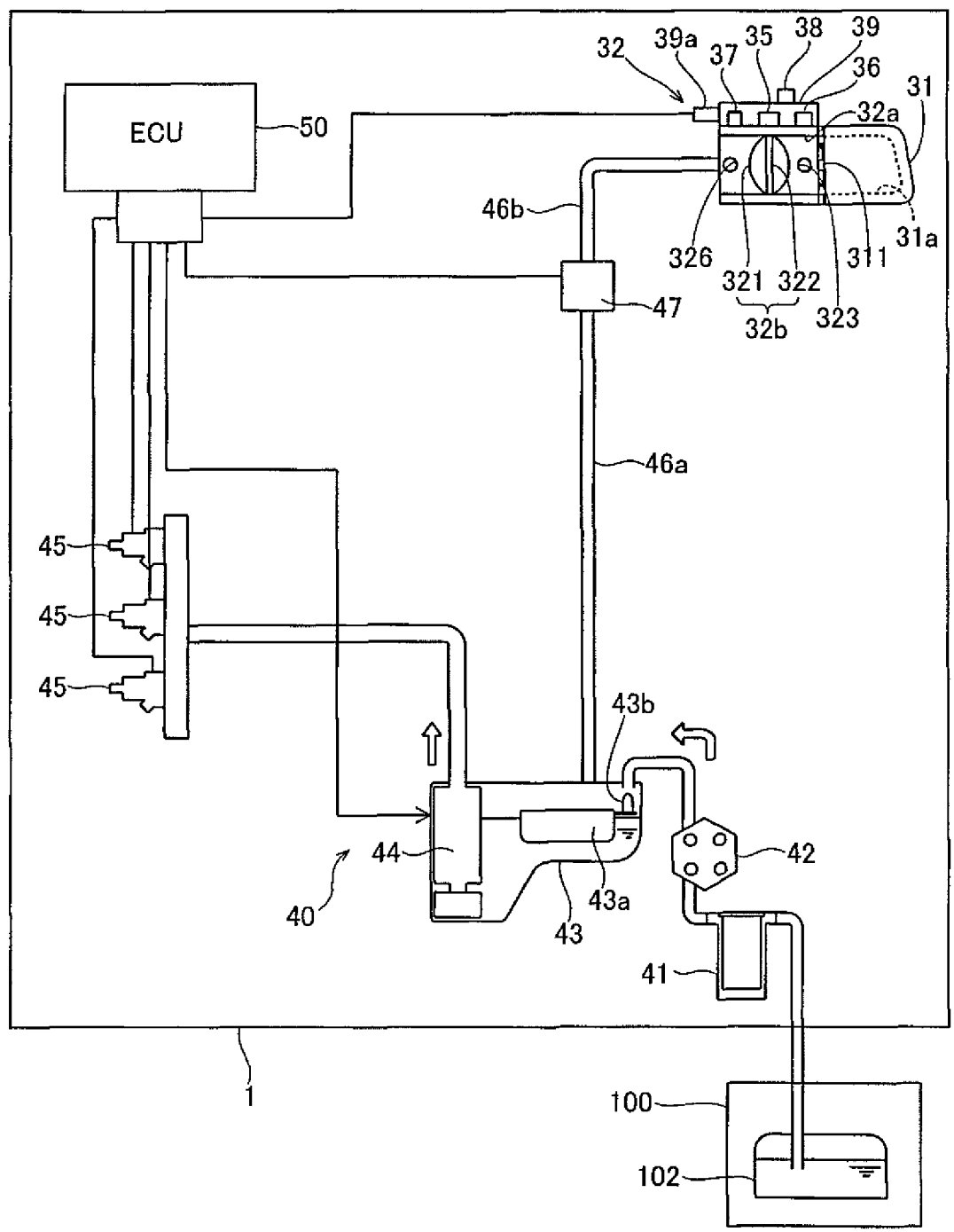
FIG. 5 is a system view of the outboard motor of the first preferred embodiment of the present invention.

FIG. 2 is a perspective view of the engine portion 2, FIG. 3 is a plan view of the same, and FIG. 4 is a left side view of the same. FIG. 5 shows a system configuration of the outboard motor 1.

The engine portion 2 includes an engine main body 20 (internal combustion engine), an intake system 30, a fuel system 40, and an ECU (Engine Control Unit) 50 (see FIG. 5). The intake system 30 supplies air to the engine main body 20. The fuel system 40 supplies a fuel to the engine main body 20. The engine main body 20 is an example of an "engine" according to a preferred embodiment of the present invention.

As shown in FIG. 3, the engine main body 20 preferably includes three cylinders 21 arranged in the up-down direction (Z direction of FIG. 2) and pistons 22 which move to reciprocate horizontally inside the cylinders 21. The pistons 22 are coupled to the crankshaft 24 via connecting rods 23. The crankshaft 24 extends in the up-down direction (Z direction). The horizontal reciprocation of the piston 22 is converted into rotating motion by the connecting rod 23 and the crankshaft 24. The lower end of the crankshaft 24 is connected to the drive shaft 3 (see FIG. 1).

The rotation of the crankshaft 24 is transmitted to a cam shaft 26. In detail, a belt 25 (see FIG. 2) is wound around a pulley (not shown) fixed to the upper portion of the crankshaft 24 and a pulley 27 (see FIG. 2) fixed to the cam shaft 26 (see FIG. 3). Accordingly, the rotation of the crankshaft 24 is transmitted to the cam shaft 26. By the rotation of the cam shaft 26, intake valves 28 and exhaust valves 29 (see FIG. 3) of the respective cylinders 21 are driven at predetermined timings.

As shown in FIG. 2 to FIG. 4, the intake system 30 is disposed lateral to the engine main body 20. In this preferred embodiment, the intake system 30 is disposed along a side portion on the right side of the engine main body 20. The intake system 30 includes a silencer case 31, a throttle body 32, a surge tank 33, and three intake pipes 34. The silencer case 31 is disposed on the forward (arrow B direction) side and has an intake port 31a (see FIG. 3). To this silencer case 31, the throttle body 32 is connected. Further, to the throttle body 32, the surge tank 33 is connected. Three intake pipes 34 extend from the surge tank 33, and are connected to intake ports of the three cylinders 21 of the engine main body 20. The throttle body 32 is coupled to the surge tank 33 preferably via screws 150, for example, and further coupled to the silencer case 31 preferably via other screws 150, for example. The intake system 30 and the silencer case 31 are examples of "intake pathway" and "intake portion" according to a preferred embodiment of the present invention, respectively.

Air taken from the vent hole 7a of the engine cover 7 follows the path shown by the arrow in FIG. 3 and FIG. 4 and flows into the intake port 31a of the silencer case 31. In other words, air taken from the vent hole 7a passes through between the engine main body 20 and the vapor separator tank 43, and further passes through between the vapor separator tank 43 and the intake system 30 (the intake pipe 34, the surge tank 33). This air further passes through between the engine main body 20 and the surge tank 33 and flows into the intake port 31a of the silencer case 31. This air passes through an air passage 32a inside the throttle body 32 and flows into the surge tank 33. This air is branched and flows into the intake pipes 34 from the surge tank 33. The air passage 32a is an example of an "intake pathway" according to a preferred embodiment of the present invention.

As shown in FIG. 4, on the side portion of the throttle body 32, a vapor introducing hole 323 is formed in the region on the upstream side of the vicinity of the throttle valve 32b. This vapor introducing hole 323 is connected to the vapor separator tank 43 via pipes 46a and 46b.

As shown in FIG. 5, to the upper portion of the throttle body 32, a holding member 39 is attached. This holding member 39 holds sensors (a throttle opening degree sensor 35, an intake pressure sensor 36, and an intake temperature sensor 37) for controlling the fuel injection amount of an injector 45. Further, the holding member 39 holds an idle speed control unit 38 (hereinafter, referred to as ISC unit 38) for adjusting the air flow amount during idling. The ISC unit 38 includes a motor not shown and a valve (not shown) which moves in the up-down direction by driving of the motor, and is disposed midway of a bypass air passage 32d. By this valve moving up and down, the flow amount of air passing through the bypass air passage 32d can be controlled and the rotation speed of the engine during idling can be controlled.

The throttle opening degree sensor 35, the intake pressure sensor 36, the intake temperature sensor 37, and the ISC unit 38 are held integrally by the holding member 39 which may be made of resin and may have a flat plate shape, for example. The throttle opening degree sensor 35 is engaged with a valve shaft 322 projecting from the upper surface of the throttle body 32 in a state in which the holding member 39 is fixed to the throttle body 32. Accordingly, the throttle opening degree sensor 35 detects the rotation angle of the valve shaft 322. The intake pressure sensor 36 can detect the air pressure on the downstream side with respect to the throttle valve 32b of the throttle body 32. The intake temperature sensor 37 projects from the inside of the holding member 39 to the inside of the air passage 32a via a hole (not shown) formed in the throttle body 32 in a state in which the holding member 39 is fixed to the throttle body 32. The intake temperature sensor 37 detects the temperature of air on the upstream side with respect to the throttle valve 32b of the throttle body 32. The holding member 39 also holds one connector 39a integrally provided. The sensors (the throttle opening degree sensor 35, the intake pressure sensor 36, and the intake temperature sensor 37) and the ISC unit 38 are connected to the ECU 50 via the connector 39a.

As shown in FIG. 2 to FIG. 5, the fuel system 40 includes a filter 41 connected to the fuel tank 102 disposed in the hull 100, a low pressure fuel pump 42 connected to the filter 41, and a vapor separator tank 43 connected to the low pressure fuel pump 42. The fuel system 40 further includes a high pressure fuel pump 44 (see FIG. 5) arranged to transport a fuel inside the vapor separator tank 43 and an injector 45 arranged to inject the fuel transported by the high pressure fuel pump 44.

The low pressure fuel pump 42 is arranged to transport the fuel from the fuel tank 102 to the vapor separator tank 43. The fuel suctioned from the fuel tank 102 provided on the hull 100 by the low pressure fuel pump 42 passes through the filter 41, and accordingly, foreign matter contained in the fuel is removed.

The fuel fed by the low pressure fuel pump 42 is stored in the vapor separator tank 43. As shown in FIG. 3 and FIG. 4, the vapor separator tank 43 is disposed between the engine main body 20, and the surge tank 33 and suction pipe 34 in a plan view.

The vapor separator tank 43 stores the fuel suctioned from the fuel tank 102, and separates vapor of the fuel or air and the liquid fuel. As shown in FIG. 5, in the vapor separator tank 43, the amount of fuel stored in the tank is kept constant, and the liquid level position of the fuel inside the vapor separator tank 43 is kept at a predetermined height. In detail, inside the vapor separator tank 43, a float 43a having a needle valve 43b is provided. When the liquid level position of the fuel inside the vapor separator tank 43 becomes higher than the predetermined height, the needle valve 43b of the float 43a automatically stops the flow of the fuel into the vapor separator tank 43. When the liquid level position of the fuel inside the vapor separator tank 43 becomes lower than the predetermined height, the flow of the fuel into the vapor separator tank 43 is automatically started. With this mechanism, the amount of fuel stored in the vapor separator tank 43 is kept constant, and the liquid level position of the fuel inside the vapor separator tank 43 is kept at the predetermined height.

The high pressure fuel pump 44 is disposed inside the vapor separator tank 43, and is arranged to transport a fuel with a predetermined pressure to the injector 45. The injector 45 is arranged to inject the fuel fed at a predetermined pressure by the high pressure fuel pump 44 to the vicinity of the intake port of the cylinder 21 (see FIG. 3) at a predetermined timing.

As shown in FIG. 2, the upper portion of the vapor separator tank 43 is connected to the vapor introducing hole 323 provided on the side portion of the throttle body 32 via a pipe 46a and a pipe 46b. Accordingly, vapor in the vapor separator tank 43 is let out to the air passage 32a of the throttle body 32. Between the pipe 46a and the pipe 46b, a solenoid valve 47 is provided, and by controlling the solenoid valve 47, the timing for letting out the vapor can be controlled.

Figure 6:
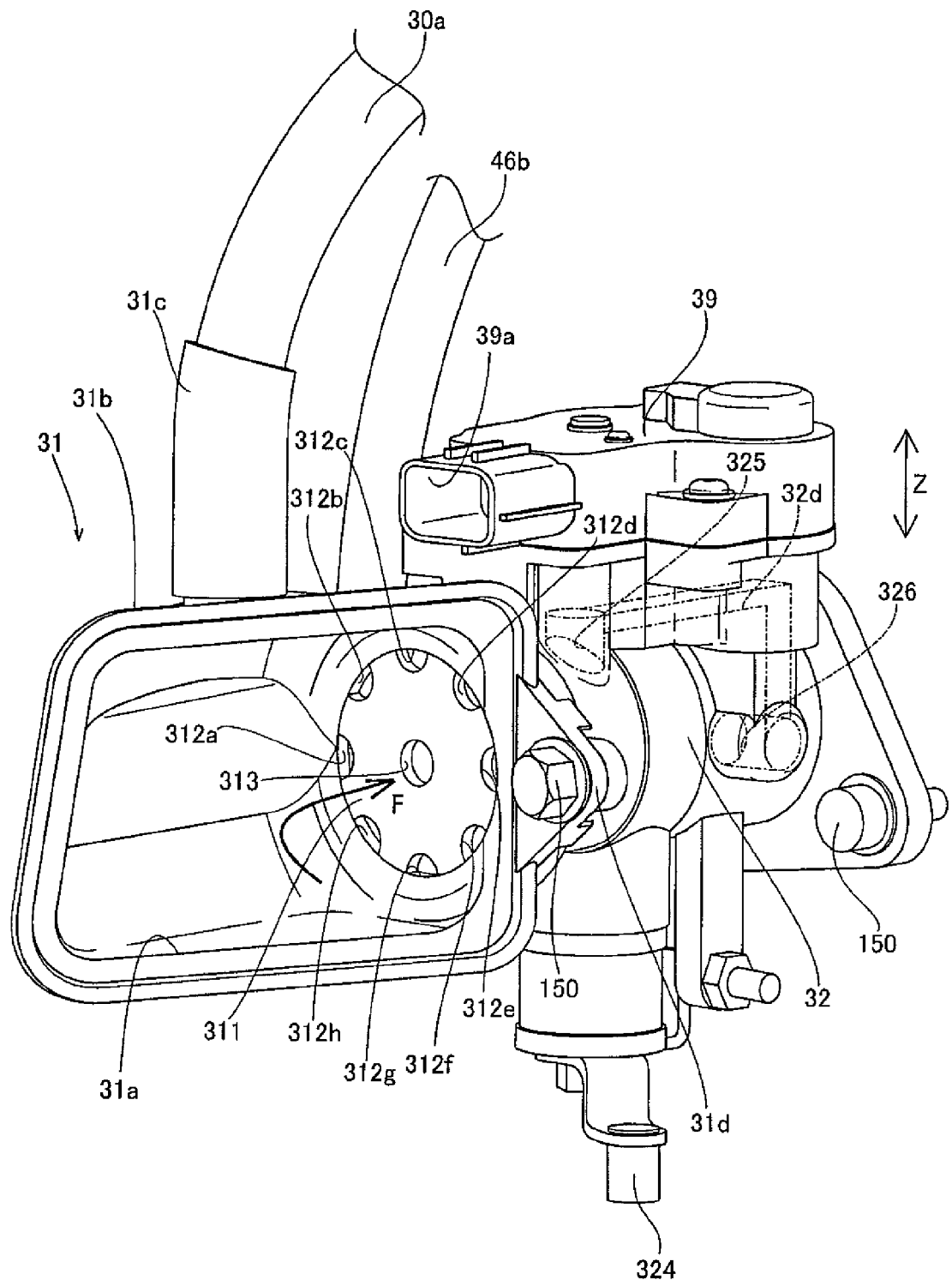
FIG. 6 is a perspective view showing a throttle body and a silencer case of the outboard motor of the first preferred embodiment of the present invention.
Figure 7:
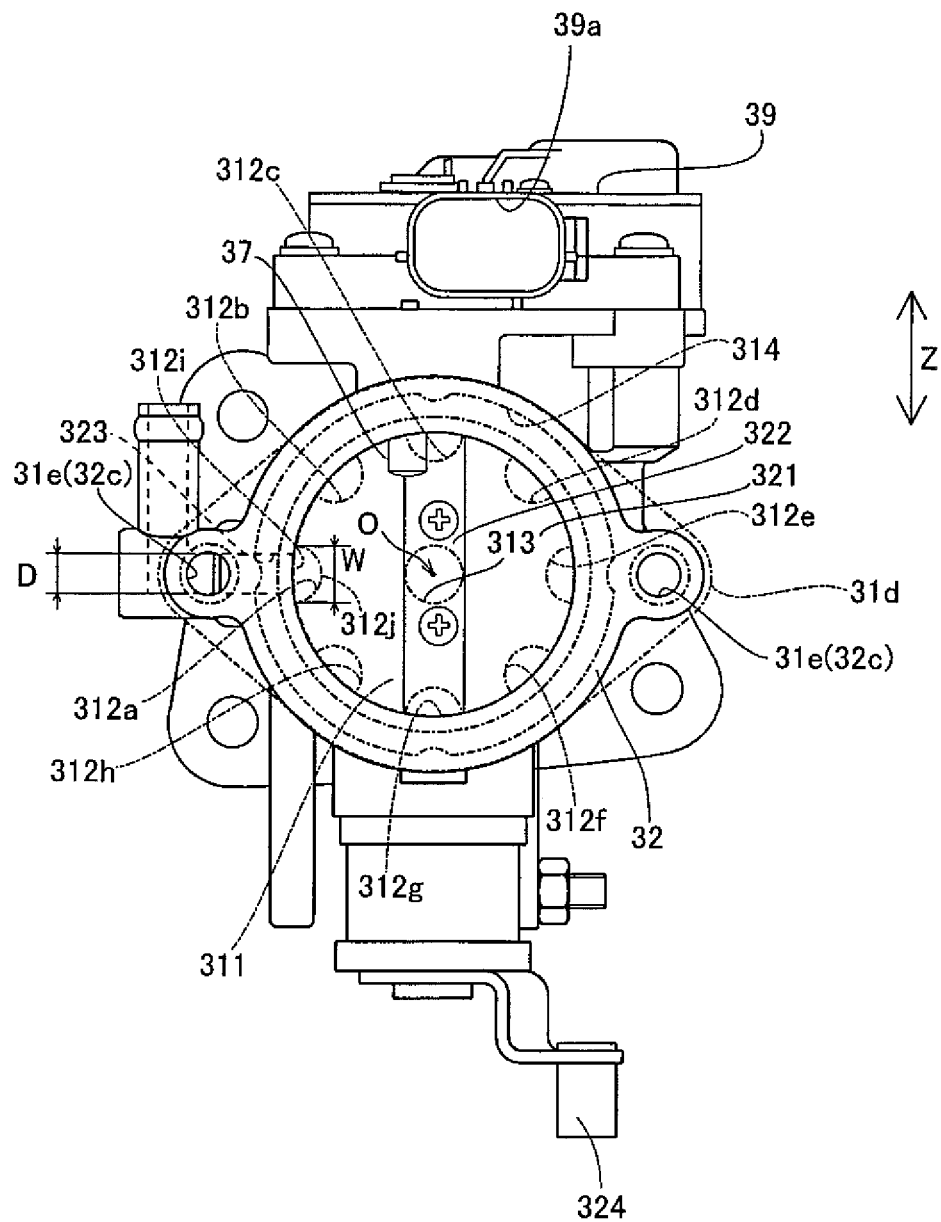
FIG. 7 is a front view showing the throttle body of the outboard motor of the first preferred embodiment as viewed in the air flowing-in direction.
Figure 8:
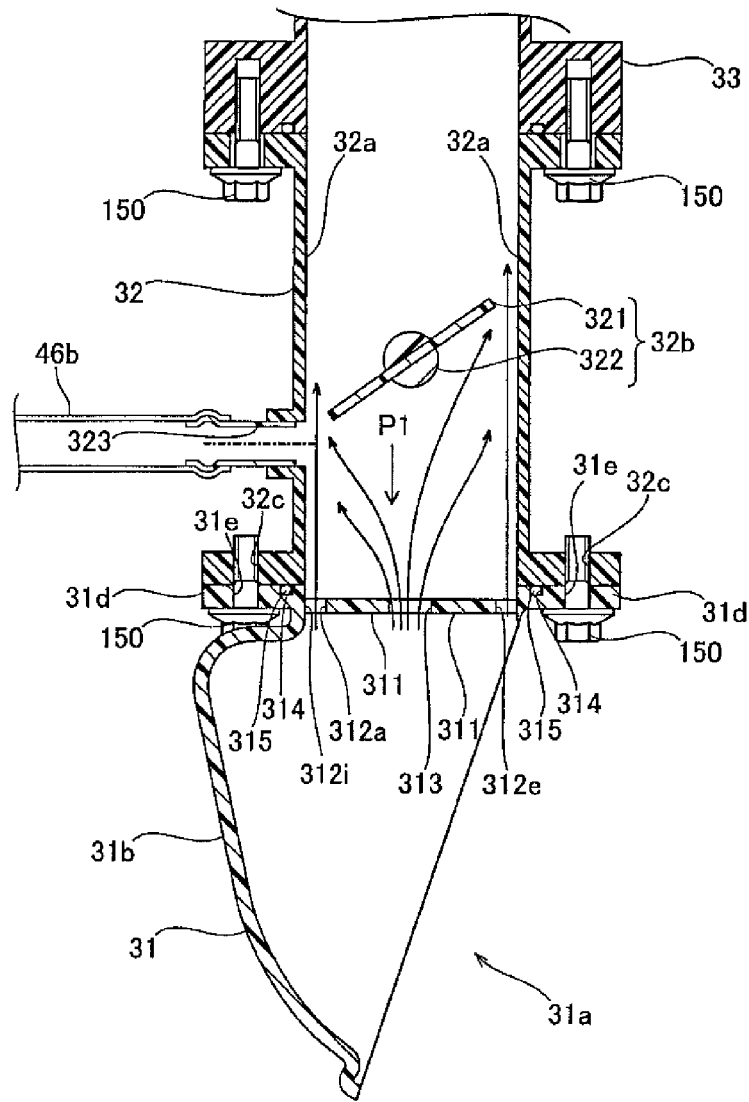
FIG. 8 is a schematic sectional view showing the throttle body and an air restrictor of the outboard motor of the first preferred embodiment of the present invention.
Figure 9:
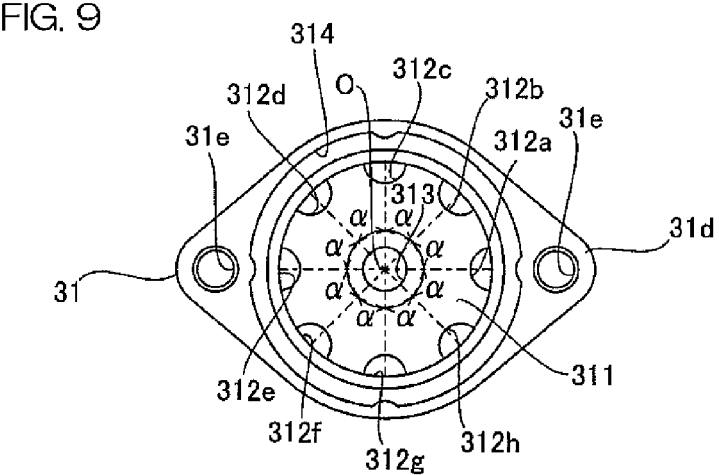
FIG. 9 is a back view of the air restrictor as viewed in the arrow P1 direction of FIG. 8 of the present invention.

FIG. 6 is a perspective view showing the silencer case 31 and the throttle body 32. FIG. 7 is a front view of the throttle body 32 as viewed in the air flowing-in direction, and FIG. 8 is a diagrammatical sectional view showing the throttle body 32 and an air restrictor 311. FIG. 9 is a back view of the air restrictor 311 as viewed in the arrow P1 direction of FIG. 8.

The silencer case 31 includes a cover 31b provided with an intake port 31a, a connecting portion 31c to which a pipe 30a described later is connected, and a flange 31d for attachment to the throttle body 32. The silencer case 31 has the air restrictor 311 that is preferably integral with the silencer case 31. The air restrictor 311 is provided at the boundary (inlet portion of the air passage 32a) between the silencer case 31 and the throttle body 32.

In the flange 31d, two screw insertion holes 31e (see FIG. 7) are formed, for example. These screw insertion holes 31e are arranged at positions corresponding to screw insertion holes 32c formed in the throttle body 32. The silencer case 31 and the throttle body 32 are joined by screws 150, for example, inserted through the corresponding screw insertion holes 31e and 32c. On the contact surface of the silencer case 31 with the throttle body 32, a groove 314 (see FIG. 9) is formed so as to surround the air restrictor 311. By fitting an O-ring 315 (see FIG. 8) in this groove 314, the O-ring 135 seals an area between the silencer case 31 and the throttle body 32.

The intake port 31a of the silencer case 31 has a quadrilateral shape as viewed in the air flowing-in direction as shown in FIG. 6. As shown in FIG. 8, air which has flown in from the intake port 31a is led to the air passage 32a of the throttle body 32 along the inner surface of the gently curved cover 31b. This air passes through a plurality of vent holes 312a to 312h and a vent hole 313 formed in the air restrictor 311 and flows into the throttle body 32.

As shown in FIG. 6, on the upper portion of the cover 31b of the silencer case 31, a tubular connecting portion 31c is formed integrally. This connecting portion 31c is connected to a pipe 30a. Unburned gas produced in the engine main body 20 is fed to the intake system 30 via the pipe 30a. The unburned gas fed to the inside of the cover 31b through the connecting portion 31c from the pipe 30a flows into the air passage 32a inside the throttle body 32 together with the air taken through the intake port 31a. The vent hole 312a, the vent holes 312b to 312h, and the vent hole 313 are examples of "first vent hole," "second vent hole," and "third vent hole" according to a preferred embodiment of the present invention, respectively.

The air restrictor 311 preferably has substantially the same circular shape as the air passage 32a of the throttle body 32 as viewed in the air flowing-in direction (arrow F direction of FIG. 6) as shown in FIG. 7. This air restrictor 311 preferably has nine vent holes as shown in FIG. 9, for example. In other words, the air restrictor 311 has eight vent holes 312a to 312h, for example, formed at the peripheral portion and one vent hole 313 formed at the central portion. The eight vent holes 312a to 312h at the peripheral portion are formed along the inner surface of the air passage 32a, and are arranged at intervals of equal angles α (α is approximately 45 degrees, for example) with respect to the center O of the air passage 32a. The amount of air to flow into the engine main body 20 through the intake system 30 is restricted by the air restrictor 311. The amount of air allowed to flow into the engine main body 20 is restricted by the air restrictor 311, so that the output of the outboard motor 1 can be adjusted.

As shown in FIG. 7, in the air passage 32a, the above-described vapor introducing hole 323 is formed. The one vent hole 312a provided at the peripheral portion of the air restrictor 311 is arranged at a position corresponding to the position of the vapor introducing hole 323 as viewed in the air flowing-in direction passing through the throttle body 32 as shown in FIG. 7 and FIG. 8. In detail, the vent hole 312a and the vapor introducing hole 323 are positioned in the same direction beginning at the point O as viewed in the air flowing-in direction. The vapor introducing hole 323 is an example of "vapor introducing hole" and "gas flow hole" according to a preferred embodiment of the present invention.

The width W in the Z direction of the vent hole 312a is larger than the diameter D of the vapor introducing hole 323. Therefore, the vent hole 312a is constructed to include the opening portion of the vapor introducing hole 323 as viewed in the air flowing-in direction as shown in FIG. 7. Accordingly, the flow of air passing through the vent hole 312a can be reliably prevented from becoming turbulent near the vapor introducing hole 323. The vent holes 312b to 312h are preferably constructed to have substantially the same width as that of the vent hole 312a.

The eight vent holes 312a to 312h are defined by the inner surfaces 312i on the outer side of the center O of the air restrictor 311 (center of the vent hole 313) and the inner surfaces 312j on the side of the center O of the air restrictor 311 (center of the vent hole 313). The outer side inner surfaces 312i are within a curved plane defined by extending the inner surface of the air passage 32a. In other words, there is no level difference between the outer side inner surfaces 312i of the vent holes 312a to 312h and the air passage 32a. The inner surfaces 312j on the inner side of the vent holes 312a to 312h preferably have substantially arc shapes.

The vent hole 313 arranged at the central portion of the air restrictor 311 preferably has a circular shape. The position at which the vent hole 313 is arranged is the center O of the air restrictor 311 as viewed in the air flowing-in direction, and matches the center O of the air passage 32a.

As shown in FIG. 8, the throttle body 32 may preferably be made of a resin or metal, and has an air passage 32a having an inner surface preferably with a cylindrical shape (see FIG. 7). In this air passage 32a, a butterfly throttle valve 32b is provided. The throttle valve 32b includes a circular valve plate 321, and a valve shaft 322 which extends in the vertical direction (Z direction) from the lower portion to the upper portion of the throttle body 32 and supports the valve plate 321 in a manner to allow the value plate 321 to turn. To the lower end of the valve shaft 322, a joint 324 (see FIG. 6) that is joined to an accelerator lever (not shown) of the outboard motor 1 is fixed. Accordingly, by an accelerator operation by a user, the valve shaft 322 and the valve plate 321 are turned via the joint 324.

The valve shaft 322 is subjected to a force for closing the valve plate 321 by a torsion spring not shown. The throttle body 32 is integrally provided with a bypass air passage 32d as shown in FIG. 6. The bypass passage 32d connects the upstream side and downstream side with respect to the throttle valve 32b of the air passage 32a. In detail, the bypass air passage 32d connects holes 325 and 326. The hole 325 is formed at an upper portion of the air passage 32a on the upstream side with respect to the throttle valve 32b. The hole 326 is formed at a lateral portion of the air passage 32a on the downstream side with respect to the throttle valve 32b. The bypass air passage 32d is arranged to pass through the throttle body 32, and secures an air flow amount for maintaining an idling state when the throttle valve 32b is fully closed.

Figure 10:
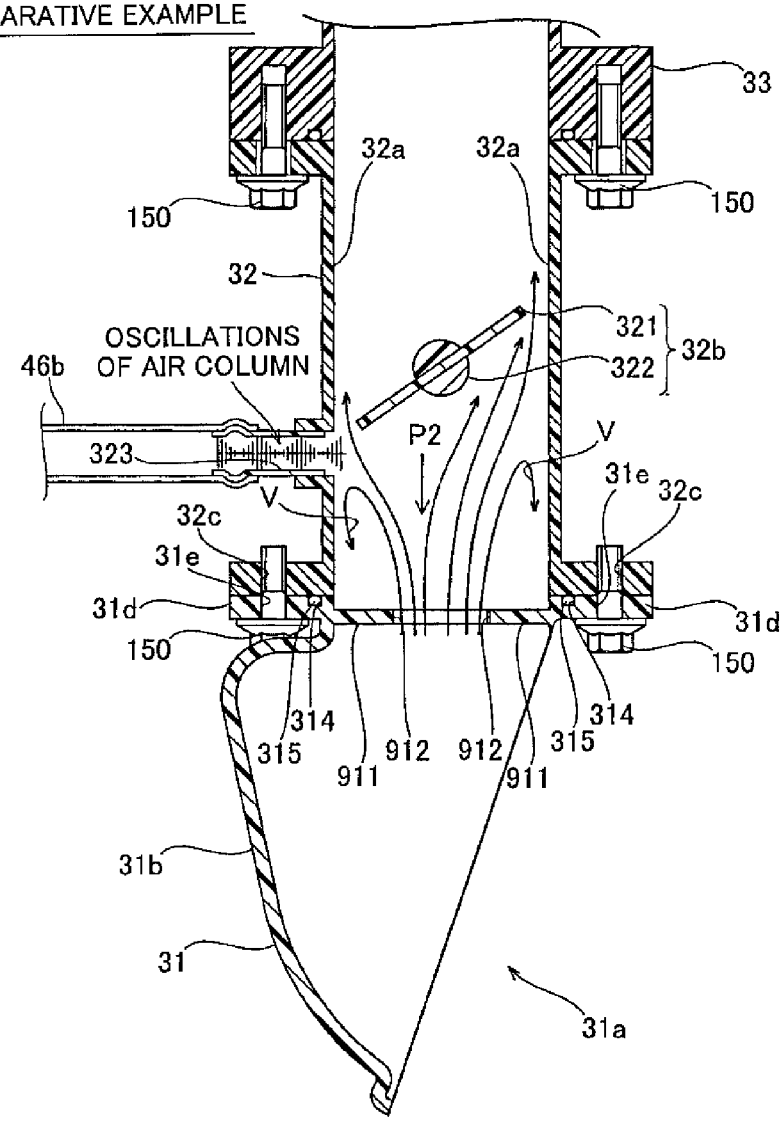
FIG. 10 is a schematic sectional view showing a throttle body and an air restrictor of a comparative example.
Figure 11:
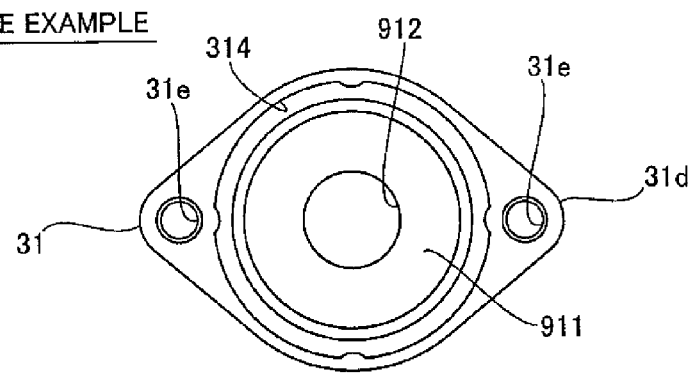
FIG. 11 is a back view of the air restrictor of the comparative example as viewed in the arrow P2 direction of FIG. 10.

FIG. 10 is a view showing an air flow inside the throttle body when an air restrictor of a comparative example is provided. FIG. 11 is a back view showing a configuration of the air restrictor of the comparative example as viewed in the arrow P2 direction of FIG. 10.

Advantages of the first preferred embodiment will be described with reference to FIG. 8 to FIG. 11.

In the air restrictor 311 of the first preferred embodiment, as shown in FIG. 8 and FIG. 9, the vent hole 312a is arranged at a position corresponding to the position of the vapor introducing hole 323 provided in the air passage 32a. Accordingly, without turbulence of the air flow near the inner surface of the air passage 32a, the air inside the air passage 32a flows straight. Accordingly, air does not generate a vortex near the vapor introducing hole 323, so that oscillations of air columns inside the vapor introducing hole 323 can be restrained or prevented. Accordingly, an occurrence of whistle noise or hoot noise can be restrained or prevented. It should be noted that, in FIG. 8 and FIG. 10, the structure of the connecting portion between the vapor introducing hole 323 and the pipe 46b is schematically shown.

On the other hand, in the air restrictor 911 of the comparative example, as shown in FIG. 10 and FIG. 11, a large-diameter vent hole 912 is arranged only at the central portion of the air restrictor 911. In this case, air flows only from the central portion into the air passage 32a of the throttle body 32. Therefore, in the region near the inner surface of the air passage 32a, the air flow is blocked by the air restrictor 911. Therefore, a vortex V of air is formed in the region near the inner surface of the air passage 32a. In this comparative example, the vortex V ranges over the vicinity of the vapor introducing hole 323 provided on the throttle body 32, and accordingly, oscillations of air columns occur inside the duct of the vapor introducing hole 323. Therefore, whistle noises or hoot noises are produced from the vapor introducing hole 323.

In the air restrictor 311 of the first preferred embodiment shown in FIG. 8 and FIG. 9, eight vent holes 312a to 312h (see FIG. 9) are arranged along the inner surface of the air passage 32a. Accordingly, the vortex V (see FIG. 10) which is formed near the inner surface of the air passage 32a when a vent hole is provided only at the center can be prevented. Further, the vent hole 312a is arranged at a position corresponding to the position of the vapor introducing hole 323. Accordingly, the air flow near the vapor introducing hole 323 of the throttle body 32 can be more effectively prevented from becoming turbulent.

Thus, in the first preferred embodiment, although the air restrictor 311 is provided on the upstream side with respect to the vapor introducing hole 323 of the air passage 32a, the air flow near the vapor introducing hole 323 becomes smooth. Accordingly, oscillations of air columns (whistle noises or hoot noises) inside the vapor introducing hole 323 can be prevented.

In the first preferred embodiment, the outer side inner surface 312i of the vent hole 312a matches (coincides with) the inner surface of the air passage 32a as viewed in the air flowing-in direction of the air passage 32a. Accordingly, the air passing through the vent hole 312a arranged at the position corresponding to the vapor introducing hole 323 can flow along the inner surface of the air passage 32a. Accordingly, the air flow near the vapor introducing hole 323 can be further prevented from becoming turbulent, and as a result, oscillations of air column inside the vapor introducing hole 323 can be more effectively prevented.

In the first preferred embodiment, the inner side inner surfaces 312j of the vent holes 312a to 312h preferably have substantially arc shapes as viewed in the air flowing-in direction of the air passage 32a. Therefore, no corner is formed on the inner side inner surfaces 312j, so that the air restrictor 311 can be prevented from being broken. When the air restrictor 311 blocks a portion of the air passage 32a and causes a pressure difference between the upstream side and the downstream side of the air restrictor 311, stresses easily concentrate on corners of the vent holes 312a to 312h. Therefore, by eliminating corners of the inner side inner surfaces 312j of the vent holes 312a to 312h, stress concentration on a portion of the vent holes 312a to 312h is prevented. Accordingly, the air restrictor 311 can be prevented from being broken by the stress concentration.

Further, in the first preferred embodiment, as described above, the plurality of vent holes 312a to 312h are preferably arranged at even intervals along the inner surface of the air passage 32a as viewed in the air flowing-in direction of the air passage 32a. In other words, the vent holes 312a to 312h are arranged at intervals of equal angles α (α is approximately 45 degrees, for example) from the center O of the air restrictor 311. Accordingly, the air flow near the inner surface of the air passage 32a through the air restrictor 311 can be made uniform.

In the first preferred embodiment, the air restrictor 311 preferably has a vent hole 313 at a position corresponding to the center O of the air passage 32a as viewed in the air flowing-in direction of the air passage 32a. Accordingly, the air can also be made to flow to the vicinity of the center O of the air passage 32a, and accordingly, generation of a negative pressure near the center O of the air passage 32a can be prevented, whereby the air flow inside the air passage 32a can be further made uniform.

In the first preferred embodiment, the air restrictor 311 is preferably integral with the silencer case 31. Accordingly, as compared to the case in which the air restrictor 31 is formed separately from the silencer case 31, the number of components can be reduced.

In the first preferred embodiment, the vapor introducing hole 323 is preferably arranged near the throttle valve 32b at which the air flow rate greatly changes and the air easily generates a vortex. However, the vent hole 312a of the air restrictor 311 is preferably provided at the position corresponding to the vapor introducing hole 323, so that the vapor introducing hole 323 can be prevented from being influenced by the vortex. Accordingly, whistle noise or hoot noise can be more reliably prevented.

In the first preferred embodiment, the vent hole 312a of the air restrictor 311 and the vapor introducing hole 323 are preferably arranged in the same direction beginning at the point O as viewed in the air flowing-in direction of the air passage 32a. Accordingly, the air flow passing through near the vapor introducing hole 323 can be prevented from becoming turbulent, so that an occurrence of whistle noise or hoot noise can be more reliably prevented.

In the first preferred embodiment, vapor of the fuel separated from the vapor separator tank 43 is introduced into the air passage 32a via the vapor introducing hole 323. While adopting this configuration, whistle noise or hoot noise which is easily produced due to the relationship between the position of the vapor introducing hole 323 and the shape of the air restrictor 311 can be prevented.

Second Preferred Embodiment

Figure 12:
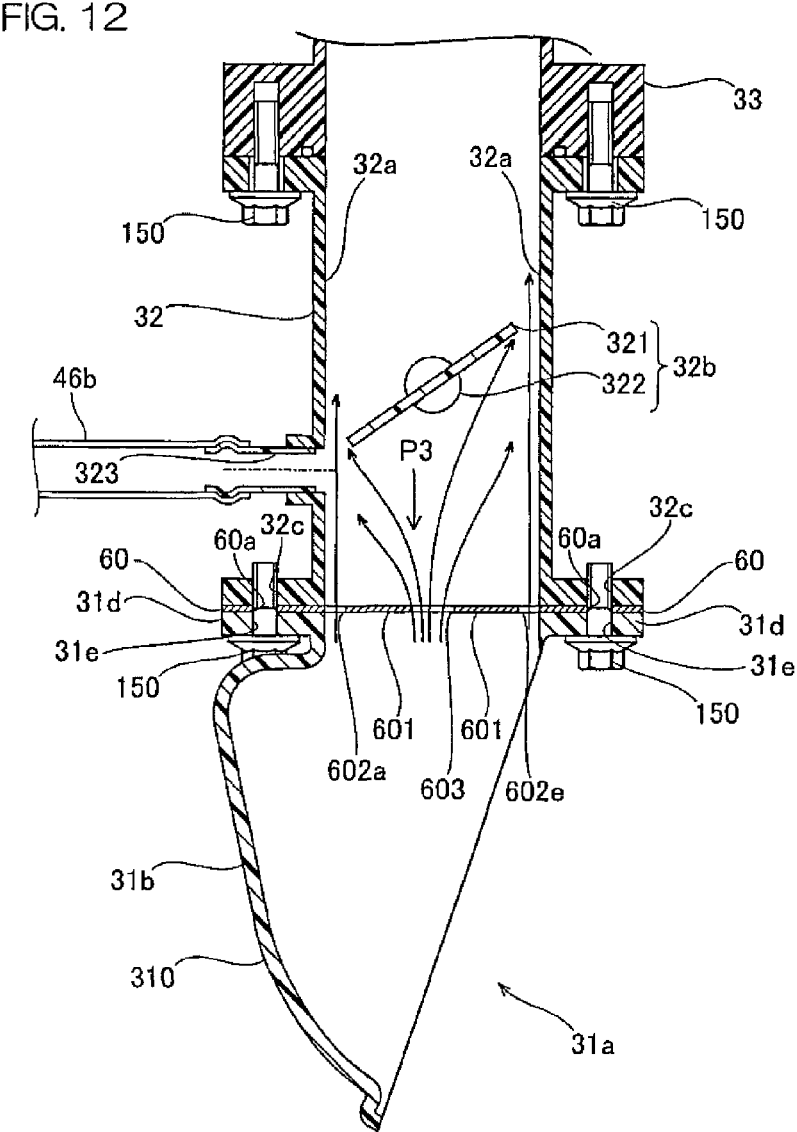
FIG. 12 is a schematic sectional view showing a throttle body and an air restrictor according to a second preferred embodiment of the present invention.
Figure 13:
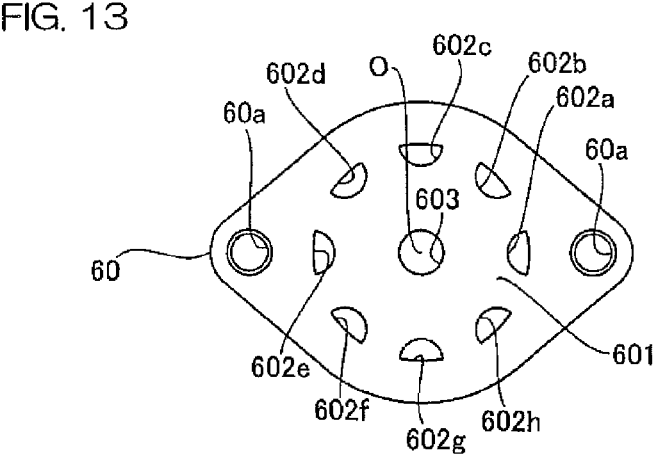
FIG. 13 is a back view of the air restrictor as viewed in the arrow P3 direction of FIG. 12.

FIG. 12 is a diagrammatical sectional view for describing a configuration of a throttle body and an air restrictor according to a second preferred embodiment of the present invention. In addition, FIG. 13 is a back view of the air restrictor as viewed in the arrow P3 direction of FIG. 12. In this second preferred embodiment, the air restrictor 601 is preferably provided on the gasket 60 disposed between the silencer case 310 and the throttle body 32. The gasket 60 is an example of a "sealing member."

In this second preferred embodiment, in the silencer case 310, an opening having substantially the same shape as the air passage 32a of the throttle body 32 is formed. In addition, between the silencer case 310 and the throttle body 32, a plate-shaped gasket 60 arranged to seal the silencer case 310 and the throttle body 32 together is disposed. The rest of the configuration of the silencer case 310 is preferably the same as in the first preferred embodiment.

As shown in FIG. 13, in the gasket 60, eight vent holes 602a to 602h, for example, are preferably formed along the inner surface of the air passage 32a, and one vent hole 603 is formed at the central portion. Accordingly, the gasket 60 constitutes the air restrictor 601 having the vent holes 602a to 602h and the vent hole 603. The arrangement and shapes of these vent holes 602a to 602h and the vent hole 603 are preferably the same as those of the vent holes 312a to 312h and the vent hole 313 of the first preferred embodiment, so that description thereof is omitted. The gasket 60 may be formed of a stainless steel (SUS) plate, an aluminum plate, a resin plate, or the like. The vent hole 602a, the vent holes 602b to 602h, and the vent hole 603 are examples of "first vent hole," "second vent hole," and "third vent hole" according to a preferred embodiment of the present invention, respectively.

In the gasket 60, two screw insertion holes 60a are preferably formed, for example. These screw insertion holes 60a are arranged at positions corresponding to the screw insertion holes 31e of the silencer case 310 and the screw insertion holes 32c of the throttle body 32 as shown in FIG. 12. The silencer case 310, the gasket 60, and the throttle body 32 are joined to each other preferably by screws 150, for example, inserted in the corresponding screw insertion holes 31e, 60a, and 32c. Accordingly, the gasket 60 seals between the silencer case 310 and the throttle body 32. Therefore, the groove 314 and the O-ring 315 (see FIG. 8 and FIG. 9) of the first preferred embodiment described above can be omitted.

In this second preferred embodiment, the air restrictor 601 is preferably defined by using the gasket 60 provided between the silencer case 310 and the throttle body 32. Therefore, in contrast to the case in which the air restrictor 601 is defined by an exclusive member, the number of components can be prevented from increasing. The advantages of provision of the vent holes 602a to 602h and the vent hole 603 in the air restrictor 601 is the same as in the first preferred embodiment.

The above-described preferred embodiments should be regarded as illustrations in every respect and should not be regarded as limitations. The scope of the present invention is defined not by the description of the preferred embodiments above but by the claims. The scope of the present invention includes all changes which are within the meaning and range of equivalency of the claims.

For example, the first and second preferred embodiments described above show examples in which the present invention is applied to the outboard motor 1 as an example of a marine vessel propulsion device; however, the present invention is also applicable to other marine vessel propulsion devices such as an inboard motor and an inboard/outboard motor.

Figure 14:
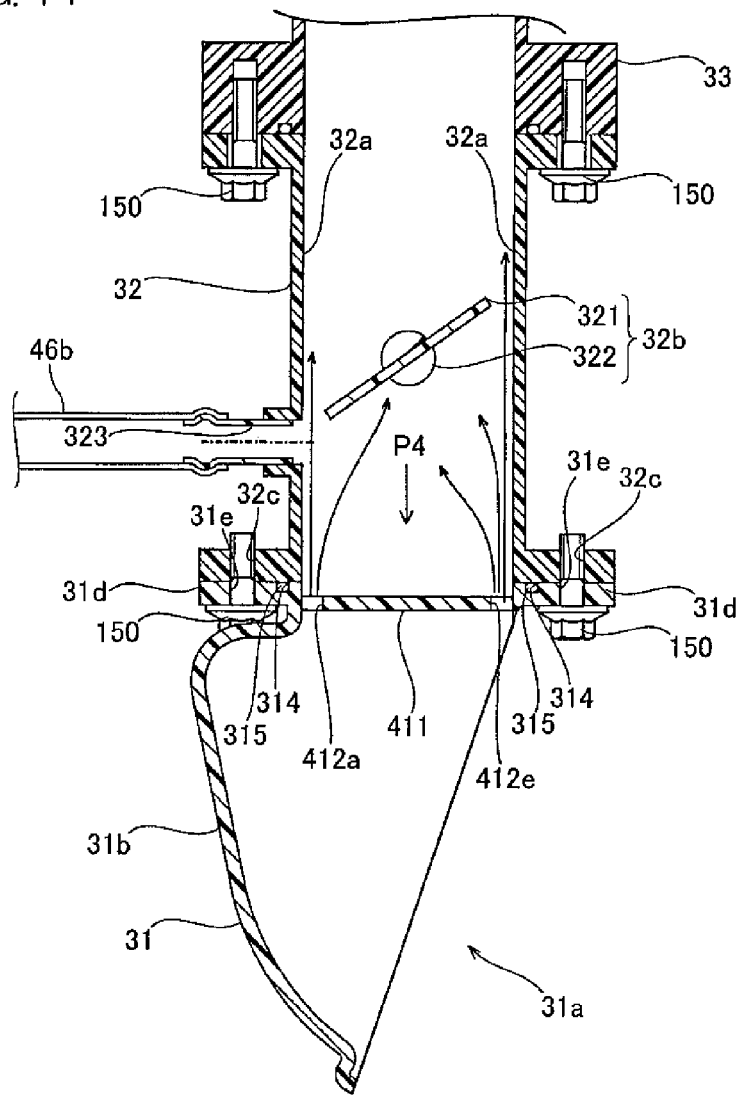
FIG. 14 is a schematic sectional view of a throttle body and an air restrictor of a first exemplary variation of preferred embodiments of the present invention.
Figure 15:
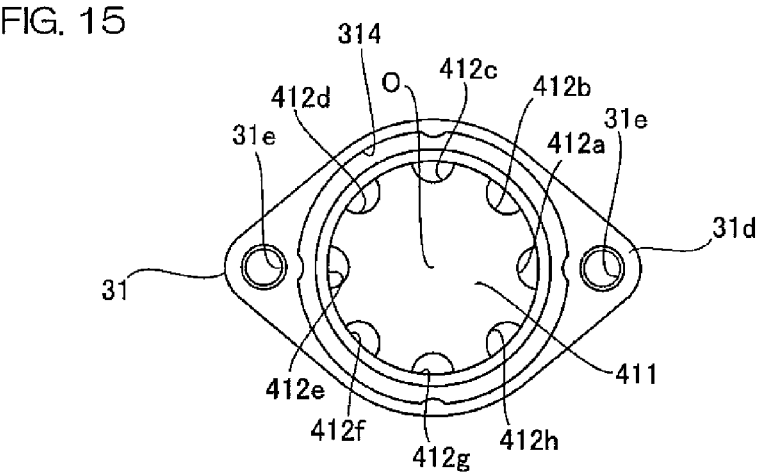
FIG. 15 is a back view of the air restrictor of the first exemplary variation as viewed in the arrow P4 direction of FIG. 14.

The first and second preferred embodiments described above show examples in which the circular vent holes 313 and 603 are provided at the central portions of the air restrictors 311 and 601; however, the present invention is not limited to these. In other words, like the first exemplary variation shown in FIG. 14 and FIG. 15, a vent hole may not be formed at the center of the air restrictor (center of the air passage). In this first exemplary variation, in the air restrictor 411, eight vent holes 412a to 412h, for example, are arranged at substantially even intervals along the inner surface of the air passage 32a of the throttle body 32. In other words, the vent holes 412a to 412h are arranged at intervals of equal angles of approximately 45 degrees when viewed from the center of the air restrictor 411. The one vent hole 412a among these vent holes is disposed at a position corresponding to the vapor introducing hole 323 formed in the throttle body 32. In detail, as viewed in the air flowing-in direction, at the central portion of the air restrictor 411 (center of the air passage 32a), a vent hole (third vent hole) is not formed. Even with this configuration, the air flow near the vapor introducing hole 323 can be stabilized, so that oscillations of air columns (whistle noise or hoot noise) can be prevented. The vent hole 412a and the vent holes 412b to 412h are examples of "first vent hole" and "second vent hole" according to a preferred embodiment of the present invention, respectively.

Figure 16:
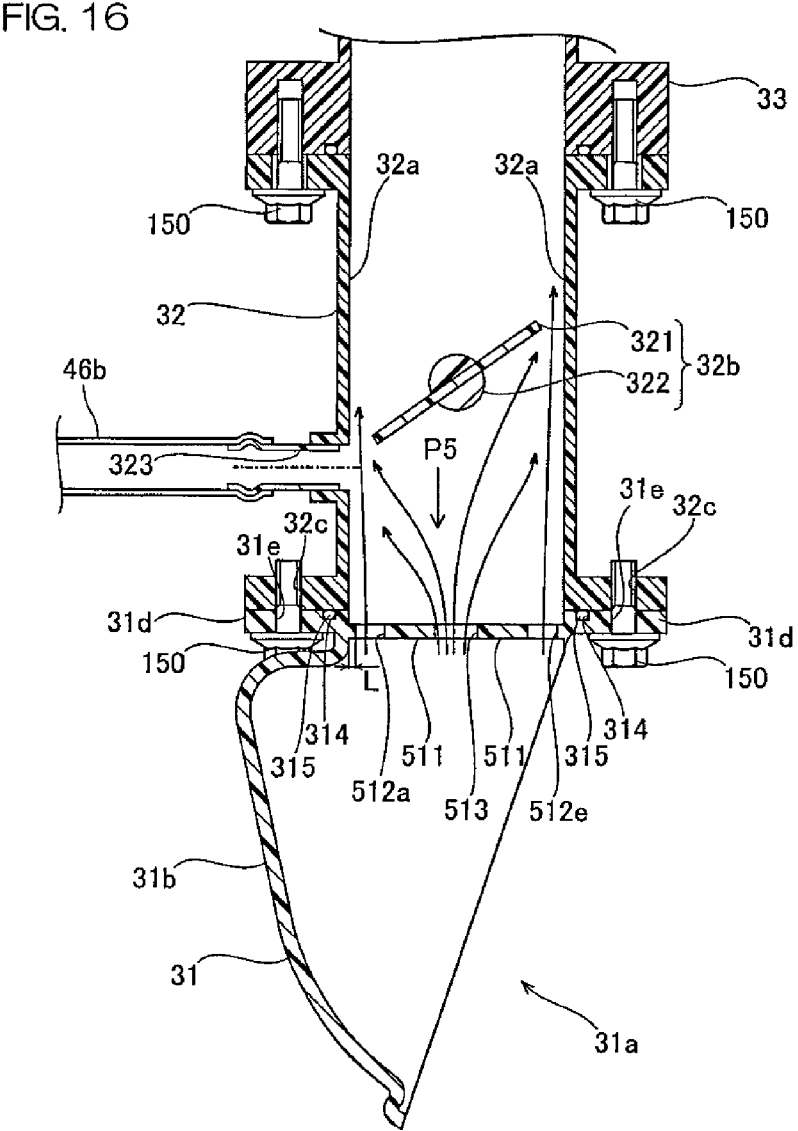
FIG. 16 is a schematic sectional view showing a throttle body and an air restrictor of a second exemplary variation.
Figure 17:
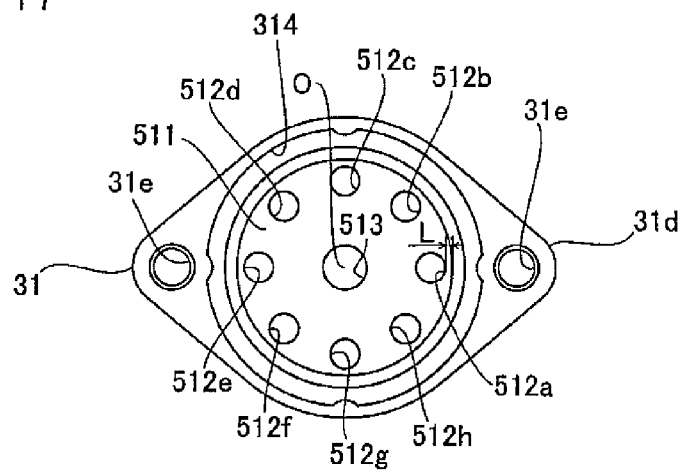
FIG. 17 is a back view of the air restrictor of the second exemplary variation as viewed in the arrow P5 direction of FIG. 16.

The first preferred embodiment described above shows an example in which the outer side inner surfaces 312i of the vent holes 312a to 312h of the air restrictor 311 are preferably arranged to overlap the inner surface of the air passage 32a as viewed in the air flowing-in direction; however, the present invention is not limited to this. In other words, like the second exemplary variation shown in FIG. 16 and FIG. 17, the first vent hole may be formed at a position that is spaced apart from the inner surface of the air passage as viewed in the air flowing-in direction. In this second exemplary variation, the vent holes 512a to 512h of the air restrictor 511 are formed at positions at a distance of L from the inner surface of the air passage 32a as viewed in the air flowing-in direction. The distance L from the inner surface of the air passage 32a to the vent hole 512a should preferably be set to be short so as not to cause oscillations of air columns inside the duct of the vapor introducing hole 323 due to generation of an air vortex near the vapor introducing hole 323. In other words, the vent hole 512a should preferably be arranged at a position which is near the inner surface of the air passage 32a and corresponds to the vapor introducing hole 323. Also, in this example, the vent holes 512a to 512h preferably have circular shapes. At the central portion of the air restrictor 511, a circular vent hole 513 is formed. Even with this configuration, the air flow near the vapor introducing hole 323 arranged on the throttle body 32 can be prevented from becoming turbulent, so that oscillations of air columns (whistle noise or hoot noise) can be prevented. In addition, the vent hole 512a, the vent holes 512b to 512h, and the vent hole 513 are examples of "first vent hole," "second vent hole," and "third vent hole" according to a preferred embodiment of the present invention, respectively.

The first and second preferred embodiments described above show an example where the air restrictor (311, 601) is preferably disposed at the boundary between the silencer case (31, 310) and the throttle body 32; however, the present invention is not limited to this. In other words, the air restrictor may be disposed at other portions on the intake passage. In detail, the air restrictor may be disposed on the intake port 31a of the silencer case 31 or the boundary between the throttle body 32 and the surge tank 33. In this case, a vent hole is formed at a position corresponding to a gas flow hole (positioned on the downstream side of the air restrictor) which may cause whistle noises or hoot noises.

The first and second preferred embodiments described above show an example where eight vent holes (312a to 312h, 602a to 602h) are preferably arranged along the inner surface of the air passage 32a of the throttle body 32; however, the present invention is not limited to this. In other words, the number of first vent holes and second vent holes to be arranged along the inner surface of the air passage is not necessarily eight, and may be not less than two and not more than seven, or not less than nine. Only one first vent hole may be provided at a position corresponding to the vapor introducing hole. The requirement is that a first vent hole is provided at a position corresponding to the vapor introducing hole.

The first preferred embodiment described above shows an example in which the air restrictor 311 preferably is integral with the silencer case 31, and the second preferred embodiment shows an example in which the air restrictor 601 is disposed on the gasket 60; however, the present invention is not limited to these. For example, the air restrictor may be integral with the throttle body. Alternately, the air restrictor may be integral with the surge tank at the boundary between the throttle body and the surge tank.

The preferred embodiments described above show an example in which the vent hole 312a is arranged at a position corresponding to the vapor introducing hole 323 provided near the throttle valve 32b; however, the present invention is not limited to this. For example, the first vent hole may be provided at a position corresponding to a gas flow hole other than the vapor introducing hole. For example, an unburned gas introducing hole for returning unburned gas from the engine to the air passage is provided in some cases. In this case, the air restrictor may be disposed on the upstream side of the unburned gas introducing hole. In this case, the unburned gas introducing hole may cause whistle noises or hoot noises. Therefore, the first vent hole may be arranged at a position corresponding to the unburned gas introducing hole. In addition, in a case where the air restrictor is disposed on the upstream side of the hole of the bypass air passage to the ISC unit, the hole of the bypass air passage may cause whistle noises or hoot noises. In this case, the first vent hole may be formed at a position corresponding to the hole of the bypass air passage.

Also, the first preferred embodiment described above shows an example in which the vapor introducing hole 323 is preferably arranged near the throttle valve 32b; however, the present invention is not limited to this. In other words, the position of the vapor introducing hole 323 may not be near the throttle valve 32b. The gas flow hole may be disposed on the downstream side of the throttle valve, or may be provided in the surge tank 33 or the intake pipe 34. In addition, the gas flow hole may not be arranged on the side portion of the throttle body 32, and may be arranged at other positions according to the design of the outboard motor or other marine vessel propulsion devices.

The preferred embodiments of the present invention are described in detail above; however, these are merely detailed examples used for making apparent the technical contents of the present invention, and the present invention should not be construed as being limited to these detailed examples, and the spirit and scope of the present invention are limited only by the appended claims.

The present application corresponds to Japanese Patent Application No. 2008-191633 filed on Jul. 25, 2008 to the Japan Patent Office, and whole disclosure of this application is incorporated herein by reference.

What is claimed is:
1. A marine vessel propulsion device comprising:
  an engine;
  an intake pathway including a gas flow hole on an inner surface thereof, the intake pathway arranged to supply air to the engine; and
  an air restrictor disposed on an upstream side with respect to the gas flow hole of the intake pathway and arranged to restrict a flow amount of air flowing into the engine via the intake pathway, the air restrictor including a first vent hole arranged at a position adjacent the inner surface of the intake pathway and corresponding to the position of the gas flow hole; wherein
a width of the first vent hole along the inner surface of the intake pathway is larger than a diameter of the gas flow hole.

2. The marine vessel propulsion device according to claim 1, wherein the first vent hole includes a first inner surface portion positioned on an outer side with respect to a center of the air restrictor, the first inner surface portion aligned with the inner surface of the intake pathway as viewed in an air flowing-in direction of the intake pathway.

3. The marine vessel propulsion device according to claim 2, wherein the first vent hole has a second inner surface portion positioned on an inner side with respect to the center of the air restrictor, the second inner surface portion having a substantially arc shape as viewed in the air flowing-in direction of the intake pathway.

4. The marine vessel propulsion device according to claim 1, wherein
the air restrictor further includes a second vent hole arranged at a position adjacent the inner surface of the intake pathway and does not correspond to the position of the gas flow hole; and
the first vent hole and the second vent hole are arranged at substantially even intervals along the inner surface of the intake pathway as viewed in the air flowing-in direction of the intake pathway.

5. The marine vessel propulsion device according to claim 1, wherein the air restrictor further includes another vent hole arranged at a position corresponding to a central portion of the intake pathway as viewed in an air flowing-in direction of the intake pathway.

6. The marine vessel propulsion device according to claim 1, wherein
the intake pathway includes:
a throttle body having a throttle valve arranged to adjust the flow amount of air to be supplied to the engine; and
an intake portion including an intake port and being connected to an upstream side of the throttle body; wherein
the air restrictor is integral with the intake portion.

7. The marine vessel propulsion device according to claim 6, wherein
the gas flow hole is arranged near the throttle valve of the throttle body;
the air restrictor is arranged near a boundary of the intake portion with the throttle body; and
the first vent hole of the air restrictor is arranged at a position corresponding to the gas flow hole arranged near the throttle valve.

8. The marine vessel propulsion device according to claim 1, wherein
the intake pathway includes:
a throttle body having a throttle valve arranged to adjust the flow amount of air to be supplied to the engine; and
an intake portion including an intake port and connected to an upstream side of the throttle body; wherein
the marine vessel propulsion device further comprises a sealing member arranged between the intake portion and the throttle body to seal an area between the intake portion and the throttle body; and
the sealing member constitutes the air restrictor having the first vent hole.

9. The marine vessel propulsion device according to claim 1, wherein the first vent hole of the air restrictor and the gas flow hole are disposed in a same direction with respect to a center of the air restrictor as viewed in the air flowing-in direction of the intake pathway.

10. The marine vessel propulsion device according to claim 1, further comprising:
a vapor separator tank arranged to separate a liquid fuel to be supplied to the engine from vapor of the fuel; wherein
the gas flow hole is a vapor introducing hole arranged to introduce separated vapor of the fuel from the vapor separator tank into the intake pathway.

11. A marine vessel propulsion device comprising:
an engine;
an intake pathway including a gas flow hole on an inner surface thereof, the intake pathway arranged to supply air to the engine; and
an air restrictor disposed on an upstream side with respect to the gas flow hole of the intake pathway and arranged to restrict a flow amount of air flowing into the engine via the intake pathway, the air restrictor including a first vent hole arranged at a position adjacent the inner surface of the intake pathway and corresponding to the position of the gas flow hole; wherein
the first vent hole is arranged to overlap with the inner surface of the intake pathway as viewed in an air flowing-in direction.

* * * * *